3,260,680
SYNTHETIC ALUMINA, SILICA-ALUMINA HYDROCARBON CRACKING CATALYST AND METHOD FOR HYDROCARBON CRACKING
Robert A. Sanford, Homewood, and Henry Erickson, Park Forest, Ill., assignors to Sinclair Research, Inc., New York, N.Y., a corporation of Delaware
No Drawing. Filed Nov. 4, 1963, Ser. No. 321,301
7 Claims. (Cl. 252—455)

This application is a continuation-in-part of our copending Serial No. 174,245, filed Feb. 19, 1962, now abandoned.

This invention is directed to a novel catalyst composition which is characterized by greatly improved catalytic activity and resistance to the harmful effects of metal poisoning and steam treatment, and to methods for its manufacture and use.

Hydrocarbon cracking catalysts in current use are characterized by a decrease in activity and selectivity, caused by relatively slow accumulation of metals normally present in most hydrocarbon feedstocks, which deposit on the cracking catalyst and are not removable by standard regeneration procedures. Thus the presence of nickel and vanadium and other metallic contaminants in the hydrocarbon feed stream leads to the rapid poisoning of most catalysts, causing a significant decrease in the product yield, an increase in coke and gas production and a marked shortening in the life of the catalyst, the extent of the product decrease usually being proportional to the amount of metal on the catalyst. Also, since a cracking catalyst is exposed to steam at a high temperature in its use, for example, in regeneration, it is desirable for the catalyst not to be hurt by such steam contact.

Petroleum refiners cope with the problem of metal poisoning by adopting several techniques. One technique includes selecting only hydrocarbon feedstocks of low metal content or treating the feedstock to minimize its metal content. Another technique requires removing from the hydrocarbon conversion system of as much metal as is fed to it per unit time, in order to obtain and retain a total amount of metal in the system below a level where the conversion process is made economically unfeasible by the poisoning effect of the metal. In most conversion processes some metal-containing catalyst is continually lost to the system in the form of fines which leave the system with effluent gases. The replacement of this loss with fresh unpoisoned catalyst reduces the net amount of metal in the system. In addition, the refiner usually will purposely remove enough poisoned catalyst from the system per unit time so that replacement with unpoisoned or less poisoned catalyst will keep the metal level at the desired equilibrium. The removed catalyst may be discarded as a waste material, or the catalyst may be demetallized and returned to the system.

The catalyst of this invention has a greater equilibrium cracking activity than most catalysts known to the art. Therefore more of the desired products of hydrocarbon conversion can be obtained in each pass through a reaction zone containing the catalyst of this invention. Also, it is generally believed that so-called "riser-cracking," which is becoming increasingly popular, will require greater activity and stability from the catalyst.

The catalyst of this invention is more resistant to metals, especially nickel, than conventional cracking catalysts; that is, metals accumulation on the catalyst of this invention has less poisoning effect on the cracking system. In operating with the catalyst of the instant invention the petroleum refiner can allow more metals to accumulate on the catalyst than on a conventional catalyst, without severe, economically disadvantageous, effects on the conversion. By allowing a greater metals accumulation, that is, by operating at a higher equilibrium metal level, the inevitable stack loss of catalyst fines allows removal of more metal from the system. Thus less catalyst needs to be purposely discarded or demetallized to keep the proper conversion efficiency with a feedstock of given metal content. Also, the use of the catalyst of this invention allows some stocks conventionally considered marginal or undesirable to be used as feed to the cracking unit without appreciable loss in catalyst selectivity and without undue sacrifice in catalyst activity.

In addition, the catalyst of this invention is far more resistant to the effect of high temperature steam, which is present in all catalytic cracking units. This greater stability may be utilized in various ways. For example, higher temperatures and steam rates can be used before regeneration, allowing more efficient stripping of the spent catalysts and resulting in higher recovery of liquid hydrocarbons and a lesser coke load in the regenerator. Since many, if not most, catalytic cracking units are limited in throughput by coke-burning capacity in regeneration, a small increase in stripper efficiency is magnified in importance.

Probably overshadowing these several advantages is the possibility of increasing the coke-burning capacity by increasing regenerator temperature. As mentioned, many units are limited in this respect to lower than otherwise feasible throughputs. In addition, feedstocks higher in coke-precursors than customary may be utilized if coke-burning limitations are raised by more efficient stripping and higher regenerator temperatures.

The catalyst of this invention is a solid, synthetic gel material containing about 30 to 75% total alumina, the balance being essentially silica. About 50 to 97% by weight of the catalyst comprises a synthetic silica-alumina gel containing about 25 to 40% alumina and about 60 to 75% silica. The catalyst also contains about 3 to 50% of synthetic alumina which is added in the form of amorphous alumina hydrate or boehmite of a crystallite size up to about 50 A. The silica-alumina preferably contains about 25 to 35% alumina and the boehmite crystallite size of the added alumina is preferably about 25 to 40 A. The catalyst contains less than about 0.5% sulfate and preferably is substantially free of sulfate, containing a maximum of about 0.4%.

It is believed that in the most effective form of the catalyst of this invention the ultimate particles of free alumina are interposed between the ultimate particles of silica-alumina to make a new type of gel structure. This is more easily accomplished, and causes greater changes in micro-pore srtucture, when the materials have been given the least amount of pre-drying, before combining the free alumina and the silica-alumina.

The silica-alumina component is a synthetic gel oxide material containing about 25 to 40% alumina. The total silica and alumina content of the mixed oxide is at least about 85 or 90%, the balance usually being other inorganic oxides which may be of benefit in particular catalytic cracking situations. Preferably the silica-alumina is substantially free of other materials and, as mentioned, contains about 25 to 35% alumina, the remaining 65 to 75% being essentially silica. This material is often similar to an unwashed conventional silica-alumina hydrogel cracking catalyst precursor, except for its higher alumina content, and may be prepared by methods akin to those methods known to the art for the production of synthetic silica-alumina cracking catalysts. Such preparations often involve forming a silica hydrogel by the precipitation of an alkali metal silicate solution with an acid such as sulfuric acid. Alumina is then precipitated by adding an alum solution to the silica hydrogel slurry and raising the pH into the alkaline range by the addition of sodium aluminate solution or by the addition of a base such as ammonium hydroxide. Conventional methods also include co-precipitation techniques wherein the acid-acting alum solution is added to the silicate solution to precipitate both silica and alumina simultaneously, perhaps with a pH adjustment for further precipitation. Also, a constant pH technique whereby the solutions of each oxide component are added continuously to a mixing vessel may be employed. In any event the alumina is precipitated in the presence of the silica to form what may be referred to as coherent aggregates of silica-alumina.

The added alumina content of the catalyst is about 3 to 50% and is obtained by combining about 3 to 100 parts of alumina as hydrous alumina with 100 parts of the silica-alumina, which may be, at the time of hydrous alumina addition, in any stage of manufacture, from the original crude hydrogel, as precipitated and separated from the aqueous supernatant liquid, to the completely "finished" silica-alumina product of the type marketed as a cracking catalyst in either dried or calcined form. For reasons of production economics, as well as other considerations outlined below, it is desirable to incorporate alumina hydrogel into the silica-alumina mixed-oxide hydrogel, preferably before either of these hydrogels is washed. Among the advantages of this procedure is the avoidance of additional wash treatments, one washing of the composite catalyst serving to remove unwanted soluble materials, particularly sulfate ions.

The catalyst of this invention may be prepared by precipitation of hydrous alumina in the presence of the silica-alumina, at a pH of about 5 to 9, but preferably the alumina hydrogel is prepared separately. In either case, the preparation is such as to produce the added alumina in the amorphous or small crystal boehmite form. The silica-alumina of the catalyst generally appears as coherent aggregates of spherical particles with a relatively narrow distribution of particle sizes, for example, about 10 to 150 microns in size. In this invention alumina particles appear to be interposed between the particles of Si-Al; upon subsequent drying, the shrinkage is such that the resultant pore structure is not an additive combination of the components. This effect is more pronounced when freshly precipitated alumina and silica-alumina, never before dried, are mixed. The increase of pore volume may be taken as an indication of greater ease of interposition of alumina between silica-alumina particles in the hydrogel state, before drying or calcination increases the bonding between particles by condensation reactions. The difference in porosity holds up even after processing which would ordinarily cause severe deactivation.

As mentioned, the added alumina comprises about 3 to 50%, preferably 9 to 25% of the weight of the finished catalyst. The alumina hydrogel to be combined with the silica-alumina hydrogel may be prepared separately from the silica-alumina mixed-oxide or in the presence of the mixed-oxide substrate. Separate preparation of the alumina may be, for example, by precipitation of alumina at alkaline pH by mixing alum with sodium aluminate in aqueous solution or with a base such as soda ash, ammonia, etc. The solution from which alumina is precipitated may contain a concentration of about 5 to 20% of the aluminum salt. Ammonia, or more preferably ammonia water, or other aqueous base, can be added to the solution until the desired amount of alumina hydrate gel is precipitated. Preferably, at the end of precipitation, the slurry is so thick that it just barely can be stirred. After formation of the alumina hydrogel is complete, it may be filtered or decanted prior to its combination with the silica-alumina hydrogel. The alumina hydrogel filter cake may be water-washed to remove part or most of its ion content, e.g., sulfate and sodium ion, present in the gel, but preferably this step is omitted. Thereafter, the material is ready for mixing with the silica-alumina hydrogel and the combined hydrogel slurry is stirred continuously until a uniform mixing is attained, usually a mixing period in the order of 30–60 minutes being sufficient. The alumina hydrate-mixed oxide slurry may then be washed and concentrated as by settling, and the aqueous material filtered off, after which the catalyst precursor is thoroughly washed to remove interfering ions, especially sodium and sulfate ions. As mentioned, sulfate must be reduced so that the catalyst contains less than about 0.5% by weight sulfate. The composite catalyst resulting from such a procedure will preferably contain about 40 to 55% total alumina.

Where the alumina gel is prepared in the presence of the silica-alumina mixed oxide, the hydrated alumina gel is preferably formed by reacting an aqueous solution of an aluminum salt of a strong inorganic acid, usually $Al_2(SO_4)_3$, with a base, preferably ammonia water at a pH which may vary from about 5 to 9. Preferably substantially all of the alumina is precipitated at a pH of about 7 to 7.5. Precipitation of alumina from an aqueous solution of an alkali aluminate by addition of an acid may also be employed. Also, the hydrous alumina may be precipitated by hydrolysis from alcohol solutions of aluminum alkoxides although the use of inorganic salts is preferred. The alumina salt solution will generally contain about 10–20% of the silica-alumina hydrogel during initial alumina precipitation.

The physical form of the catalyst varies with the type of manipulative process to which it will be exposed. In fluid processing, gases are used to convey the catalyst between reaction and regeneration zones and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns or less. Such a fluidizable particle size may be obtained by partially dewatering the hydrogel slurry to about 8–14% solids in preparation for spray drying, which converts the combined hydrogels into a microspherical cracking catalyst. Alternatively the gel composite may be formed to macro-shape by pelletting, extrusion, etc., and dried. Often the catalyst will be calcined before use, but generally in hydrocarbon cracking systems fresh catalyst is added to the regenerator where temperatures high enough for calcination in situ usually prevail. Where a fixed or moving non-fluidized bed of catalyst is to be used, the catalyst is in macro particle size, for example, about $\frac{1}{16}$ to $\frac{1}{2}$ inch in diameter and $\frac{1}{16}$ to 1 inch in length. These dimensions are usually $\frac{1}{8}$ to $\frac{1}{4}$ inch.

As mentioned, in making the catalyst about 3 to 100 parts of the hydrous synthetic alumina (dry basis), preferably 10 to 35 parts of alumina, are generally combined with 100 parts of mixed silica-alumina (dry basis). Thus the catalyst contains about 3 to 50% of synthetic alumina dispersed in the mixed-oxide silica-alumina, preferably about 9 to 25% and the total alumina content of the catalyst is between about 30 and 75%, preferably around 40 to 55% on a dry basis. For example, about 20 to 30 parts synthetic alumina hydrate gel may be combined with about 100 parts of silica-alumina aggregate containing about 30% alumina to give a catalyst having a total alumina content of about 45 to 53%.

The catalyst of the invention is especially useful in the conversion or cracking of normally liquid, heavier hydrocarbons, usually of petroleum origin, to produce lighter or lower boiling products especially gasoline. Typically the feed is a petroleum gas oil and is often a mixture of straight run and recycle gas oils. Since the catalyst is resistant to nickel-poisoning it can be used to crack hydrocarbon stocks which contain soluble or dispersed nickel contaminants. Nickel occurs in natural hydrocarbons as a very minor constituent yet, as well known, its effect on cracking catalysts is economically significant, for instance in terms of gasoline yield, hydrogen production and coke laydown on the catalyst. In present commercial operations the hydrocarbon cracking feeds seldom contain less than say about 0.05 p.p.m. Ni, calculated as NiO. More often this nickel content is at least about 0.1 p.p.m. but usually does not exceed about 0.5 p.p.m. Such feedstocks can be converted when using the catalyst of the present invention but if desired hydrocarbons containing greater amounts of nickel, say up to about 15 or more p.p.m. Ni, calculated as NiO, may be used. Cracking conditions are well known and include temperatures of about 850 to 1050° F., pressures of up to about 100 p.s.i.g. catalyst-to-oil ratios of about 5 to 25:1, and space velocities of about 3 to 60. The reaction is generally conducted in the essential absence of added free hydrogen and the catalyst may be employed as a fluidized bed of small particles or as a fixed or moving bed of larger particles.

It is preferable, when practicing the hydrocarbon cracking process of this invention to conduct the cracking under conditions which minimize the coke content of both the regenerated and spent catalyst. Such a procedure often reduces still further the poisoning effects on the catalyst of the metal contaminants of the hydrocarbon feedstock. Therefore, the cracking system preferably employs conditions which minimize the coke level on the catalyst, for example, by a high rate of catalyst circulation through the reactor and to the regenerator and by an extended regeneration period. Also, steps may be taken to increase the efficiency of steam-stripping of the catalyst before regeneration.

Conventional catalytic conversion systems usually include regeneration procedures in which the catalyst is periodically contacted with free oxygen-containing gas in order to restore or maintain the activity of the catalyst by removing carbon. Conventionally fluid catalyst regenerators process about 5–40 or more tons of catalyst per minute, using about 2000 to 2800 standard cubic feet of air per ton of catalyst. The average residence time for a quantum of catalyst is often about 3–10 minutes. In this invention the regenerated catalyst may have a carbon content less than about 0.15%, advantageously less than about 0.10%. Also, the catalyst in the reactor may be prevented from accumulating more than about 1.0%, advantageously less than about 0.9% carbon. To accomplish this, catalyst may be held in the regenerator for a time generally longer than the conventional procedures by increasing the amount of the catalyst inventory undergoing regeneration at any particular time relative to the rate of catalyst flow. For instance, a quantum of catalyst may remain in the regenerator for longer than 10 minutes, or even up to about 20 or more minutes. Oxygen efficiency may also be kept high in the regenerator by increasing the air rate, for example, to greater than about 3000 standard cubic feet of air per ton of catalyst circulated. Also, the partial pressure of oxygen in the regenerator gas should be kept high and the regeneration temperature may also be increased. In conventional fluid regeneration the oxygen content of the flue gas may be about 0.5–3% while in a preferred process using this invention, the flue gas is more likely to contain about 4–5% or more oxygen. Staged regeneration and burning rate promoters may also be employed.

The following examples describe the preparation and properties of the catalyst of the invention but are not to be considered limiting.

Catalysts were made from commercially obtained "low alumina" and "high alumina" synthetic silica-alumina gel uncalcined fluid cracking catalysts. These catalysts are denominated samples AF and CF, respectively, in Table I below. Catalyst BF was made from catalyst AF by slurrying 382.5 g. (dry weight) of the latter for 10 minutes in a solution of 441 g. $Al_2(SO_4)_3 \cdot 18H_2O$. Concentrated $NH_4OH$ was added until the pH was constant at 7.0. The slurry was stirred for 15 minutes, filtered and washed to a low sulfate content, less than about 0.5%. Catalyst IIF was made from catalyst CF by a similar procedure. Each catalyst, under X-ray examination, showed the added alumina to be substantially amorphous.

Portions of each of the four catalysts were poisoned to a nickel level of approximately 500 p.p.m. NiO, by absorbing on the catalyst a solution of a nickel chelate of ammonium ethylenediamine-tetraacetate, and heating to decompose the chelate salt. These catalysts are denoted in Table I as samples AP, BP, CP and IIP, respectively. Sample BQ was prepared as was sample BP except that the NiO content was increased to 1000 p.p.m. Each sample was dried, calcined and steam treated for 6 hours in an atmosphere of steam. The treatment of samples AF, AP, BF and BP was at 1150° F. while the others were treated at 1450° F. This steam treatment has been found to equilibrate the catalyst towards the levels of a commercially equilibrated, unpoisoned catalyst.

Each of these nine samples was used to test-crack a petroleum hydrocarbon East Texas gas oil fraction (feedstock B) having the following approximate characteristics:

| | |
|---|---:|
| IBP (° F.) | 490–510 |
| 10% | 530–550 |
| 50% | 580–600 |
| 90% | 650–670 |
| EP | 690–710 |
| Grav. (° API) | 33–35 |
| Visc. (SUS at 100° F.) | 40–45 |
| Aniline point, ° F. | 170–175 |
| Pour point, ° F. | 35–40 |
| Sulfur, percent | 0.3 |

The results of the test cracking are given in Table I, where RA stands for relative activity, D + L for distillate plus loss, GF for gas factor, CF for coke factor and GG for gas gravity.

TABLE I

| Catalyst | AF | AP | BF | BP | BQ | CF | CP | IIF | IIP |
|---|---|---|---|---|---|---|---|---|---|
| Percent $Al_2O_3$ | 12.9 | 12.9 | 25.6 | 25.7 | 25.6 | 25.7 | 25.7 | 36.8 | 36.8 |
| P.p.m. NiO | None | 470 | None | 488 | 998 | None | 481 | None | 561 |
| Test Cracking: | | | | | | | | | |
| RA | 68.4 | 42.8 | 63.4 | 53.0 | 67.3 | 41.0 | 32.5 | 59.5 | 56.0 |
| D + L | 46.9 | 37.1 | 45.1 | 41.3 | 46.5 | 36.2 | 31.8 | 43.7 | 42.0 |
| GF | 0.79 | 1.12 | 0.84 | 1.08 | 1.18 | 0.96 | 1.22 | 0.80 | 0.93 |
| CF | 0.65 | 1.06 | 0.70 | 0.83 | 0.91 | 0.96 | 1.20 | 0.70 | 0.86 |
| GG | 1.49 | 1.19 | 1.42 | 1.30 | 1.20 | 1.31 | 1.13 | 1.38 | 1.24 |
| Percent Change from Unpoisoned Catalyst: | | | | | | | | | |
| RA | | −33 | | −16 | +6 | | −21 | | −6 |
| D + L | | −21 | | −8 | +3 | | −12 | | −4 |
| GF | | +42 | | +29 | +40 | | +27 | | +16 |
| CF | | +48 | | +19 | +30 | | +25 | | +23 |
| GG | | −20 | | −8 | −15 | | −14 | | −10 |

A number of important observations may be made from these test results. The degradations in activity and selectivity when catalysts AF and CF were poisoned are marked. Even catalyst BF, which comprised alumina deposited on silica-low alumina aggregates showed deterioration due to poisoning. Although the greater nickel content of catalyst BQ provided an improvement in activity, a great proportion of this activity went into production of unwanted products as evidenced by the high gas and coke factors. Samples IIF and IIP, made according to the process of the instant invention, however, showed great resistance, in both activity and selectivity, to the poisoning effect of nickel. The data of Table I shows also the importance of sufficient alumina in the silica-alumina aggregates in order to produce a good activity-selectivity profile. The enhanced activity of catalysts made according to this invention is obvious. Heretofore, when preparing synthetic silica-alumina cracking catalysts, it has been considered that the most advantageous catalyst contained 27 to 35% alumina, especially about 30 to 31%, see U.S. Patent 2,872,410; but increasing the alumina content by separate hydrogel addition to a silica-high alumina gel catalyst in accordance with the present invention significantly enhanced the properties of the catalyst as shown by the data of Table I.

In another series of preparations the effect of residual sulfate content in the catalysts was studied. A spray-dried, washed $SiO_2$:30.1% $Al_2O_3$ gel, termed "Feed Belt Product," containing 66.4% $H_2O$ and 0.69% $SO_4$, was mixed for 15 minutes with 14% of a washed alumina gel containing 0.33% $SO_4$, filtered and dried. The product is catalyst G, Table II. A spray-dried, washed $SiO_2$: 26.5% $Al_2O_3$ "Feed Belt Product" containing less than about 0.05% $SO_4$ (sample LF) was mixed, in the manner of sample G, with an alumina containing less than 0.05% $SO_4$. The alumina gel was a mixture of amorphous alumina and boehmite having a crystallite size of about 30–35 A. The filtered and dried product is catalyst III.

TABLE II

| Catalyst | G, percent | III |
|---|---|---|
| Sulfate | 0.64 | <0.1 |
| Total percent $Al_2O_3$ | 43.9 | 42.1 |
| Test Cracking: | | |
| Relative Activity | 27.4 | 39.3 |
| D + L | 28.7 | 35.5 |
| Gas Factor | 1.10 | 1.02 |
| Coke Factor | 1.25 | 0.74 |
| Gas Gravity | 1.29 | 1.35 |

The wide difference in stability due to the minor difference in sulfate content will be noted. Further evidence of the deleterious effect of residual sulfate is given in the following examples.

An alumina hydrogel is prepared in commercial quantities as follows:

In a tank containing 5700 gallons of water at 84° F. are dissolved 300 lbs. of soda ash. When the soda ash has been dissolved, 180 gallons of a 39% concentration aqueous sodium aluminate solution are pumped into the tank in about a 15 minute period. The contents of the tank are at about 84° F. Six hundred gallons of aqueous aluminum sulfate of 7.8% concentration, as $Al_2O_3$, are added to the admixture over an 80 minute period with water of dilution in conjunction with and in addition thereto diluting the reaction mass at a rate of 25 gallons per minute.

The pH of the resulting aqueous reaction mass is adjusted to 8.0 with about 75 gallons of 39% concentration aqueous sodium aluminate solution which, while being added, is also diluted continuously with water at a rate of 35 gallons per minute over a 7½ minute addition period. The contents of the tank are heated to about 100° F. and pumped to storage.

The precipitated, hydrated alumina is thereafter filtered on a large gel filter. The filtered product is partially purified by a one-cycle, water-wash on the filter on which it is collected. This filter is a string vacuum type drum filter with a built-in water spray nozzle directed toward the filter drum. Material on the drum is contacted with water as the drum rotates past the nozzle. After washing, the wet silica-alumina hydrogel is stripped from the drum.

A silica-alumina hydrogel is prepared by the following technique.

To a batch tank is added 4,275 gallons of water preheated to 90° F., and 865 gallons of sodium silicate solution (28.8% weight percent $SiO_2$, 40–41.5 Baumé at 68° F. and $Na_2O:SiO_2$ ratio of 1:3.2) is added. The batch is stirred for five minutes. The concentration of the sodium silicate, as $SiO_3$, in the batch is 6.3 weight percent.

With the batch at 90° F., 302 gallons of 34.5 weight percent sulfuric acid solution at 182° F. are added over a period of 45 minutes. The gel forms about 35 minutes after acid addition is begun. Then the pH is adjusted to 8.0–8.5. The batch is agitated for ten minutes.

Then 715 gallons of alum (7.8 weight percent, as $Al_2O_3$) is added to the gel over a period of about 36 minutes. The batch is agitated for an additional five minutes whereupon 205 gallons of sodium aluminate solution (24.4 weight percent as $Al_2O_3$) diluted in 1080 gallons of water is added over a period of 17 minutes. After all the sodium aluminate is added, the pH is checked and found to be between 5.0 and 5.2. The alumina content of the silica-alumina hydrogel is 30–31%.

This silica-alumina mixed-oxide hydrogel, without washing, mixed with 1740 gallons of the alumina hydrogel filter cake previously made for one hour. The finished batch has a pH of 5.5 to 5.6 and a temperature of about 110° F. The aqueous gel mixture is then pumped to a dewatering filter, and the filter cake from said dewatering filter and a portion of aqueous gel are blended to give a gel slurry of about 14 weight percent solids. The hydrogel mixture is spray dried in a spray drier conventionally used in catalyst manufacture. The inlet temperature may be in the order of 420° F. and the outlet temperature may be in the order of 250° F.

After spray-drying the microspherical xerogel particles are purified by using a warm water wash (130°–140° F.) and approximately 8 gallons of warm water per pound of the spray dried catalyst, followed by an ammonia treatment. The samples are then dried and evaluated.

Catalyst J, Table III, is a portion of this commercial-size batch. The sulfate content was deliberately left at 8.2%. Catalyst IV, Table III, is a portion of the catalyst of sample J rewashed to a sulfate content of 0.44%. The added alumina in catalyst IV was a mixture of amorphous alumina and boehmite having a crystallite size of about 35 A. The effect of sulfate content on activity, both virgin and equilibrated is very marked.

TABLE III

| Catalyst Sample | J | IV |
|---|---|---|
| Percent $SO_4$ | 8.2 | 0.44 |
| Test Cracking Virgin: | | |
| Relative Activity | 117.5 | 150.0 |
| D + L | 60.0 | 65.5 |
| Gas Factor | 0.97 | 0.91 |
| Coke Factor | 0.97 | 0.88 |
| Gas Gravity | 1.33 | 1.40 |
| Steamed 24 hrs. 1,150° F.: | | |
| Relative Activity | 69.0 | 81.5 |
| D + L | 47.1 | 51.0 |
| Gas Factor | 0.89 | 0.88 |
| Coke Factor | 0.70 | 0.69 |
| Gas Gravity | 1.46 | 1.40 |
| Re-steamed 6 hrs. 1,450° F.: | | |
| Relative Activity | 30.9 | 44.5 |
| D + L | 31.0 | 38.0 |
| Gas Factor | 1.08 | 1.00 |
| Coke Factor | 0.82 | 0.77 |
| Gas Gravity | 1.34 | 1.29 |

The crystalline nature of the added alumina is important as shown by the data of Table IV below. Samples LF and III are described above. Sample LA is a "Feed Belt Product," a commercial $SiO_2$:30% $Al_2O_3$ complete except for the final drying, dried and calcined for this test. Sample LB, is a portion of undried sample LA slurried with an alumina gel containing 82% boehmite of an average 67 A. crystalline size, the balance being amorphous. The product was filtered, dried and calcined. Sample LC, is a portion of undried sample LA slurried with an alumina hydrate composed entirely of alumina trihydrate, dried and calcined. Sample LD is a portion of undried sample LA slurried with an alumina hydrate containing 82% large crystallite gibbsite, the balance being boehmite. The product was dried and calcined. Sample V was prepared by adding 15% by weight of the catalyst of a completely amorphous alumina hydrate to undried sample LA, and completing for evaluation. This sample was washed to reduce the sulfate content to less than about 0.5% and during the wash some of the added alumina was lost due to peptization. The finished catalyst contained about 9% added alumina. The test cracking, in each case, was performed after steaming the catalyst for 6 hours at 1450° F.

TABLE V

| Sample | Added Al$_2$O$_3$ | | Test Cracking | | | | |
|---|---|---|---|---|---|---|---|
| | Percent | Form | R.A. | D+L | GF | CF | GG |
| LA | | | 24.6 | 26.9 | 1.06 | 1.22 | 1.36 |
| LB | 9.8 | 67 A. boehm. (82%) + amorphous | 33.3 | 32.4 | 1.09 | 1.11 | 1.30 |
| LC | 5.5 | Trihydrate | 24.0 | 26.4 | 1.11 | 1.43 | 1.27 |
| LD | 8.9 | 82% gibbsite + boehmite | 40.3 | 35.9 | 1.31 | 1.07 | 1.35 |
| V | 9 | Amorphous | 33.5 | 32.5 | 0.95 | 0.78 | 1.34 |
| LF | | | 26.6 | 28.1 | 1.03 | 0.99 | 1.32 |
| III | 15.6 | 30-35 A. boehm | 39.3 | 35.5 | 1.02 | 0.74 | 1.35 |

The effect of the alumina crystal characteristics is evident in the retention of both activity and selectivity after a severe deactivation treatment. Both sample V, containing amorphous added alumina, and sample III, containing added small crystallite boehmite alumina, present activity-selectivity profiles more favorable than the other catalysts tested. Note especially the very low coke factors. Although sample LD which contained added alumina as gibbsite showed a greater activity, a great part of this activity went into the production of undesirable off-gases.

Table VI illustrates another full commercial plant scale manufacture of conventional high-alumina synthetic and the catalyst of the present invention. Samples MA, Table VI, is a commercial high alumina synthetic cracking catalyst of the characteristics listed. Performance data are given for catalyst samples following 24 hours' steaming at 1150° F. plus 6 hours' 1450° F. steam deactivation and for other samples following a 7½ day steam-oil deactivation in a 3 barrel/day pilot plant, operated at 1250° F. regenerator temperature and with 1 atmosphere, steam partial pressure (50% steam) in the regenerator.

Sample VI, Table VI, represents the present invention. This catalyst was prepared by adding to a freshly prepared SiO$_2$:30.9% Al$_2$O$_3$ hydrogel, prepared by conventional methods, an alumina hydrate containing 53% boehmite of a 33 A.U. crystallite size, the balance being amorphous. The mixture contained 45% alumina on a dry basis. The composite was handled and deactivated as the commercial batch described above and essentially all sulfate was washed out.

The data of Table VI clearly show the superiority of the new catalyst when compared to a high quality commercial catalyst. As a further comparison, Table VII compares the new catalyst with examples of other commercially available hydrocarbon cracking catalysts. Sample NA is a low (13.7%) alumina synthetic silica-alumina mixed oxide catalyst made by precipitation of silica and alumina as a mixed-oxide gel, draining off the excess water, grinding to a size suitable for spray-drying, drying and washing of the gel. NB is a high (24.0%)

TABLE VI

| Catalyst Sample | M | VI |
|---|---|---|
| Percent Al$_2$O$_3$ | 28.4 | 45.0 |
| N$_2$ Area, m.$^2$/g | 425 | 510 |
| Total Pore Volume, cc./g | 0.80 | 1.05 |
| Loose Density, g./cc | 0.436 | 0.388 |
| Packed Density, g./cc | 0.476 | 0.422 |
| Attrition loss, percent | 8.1 | 6.1 |
| Test Cracking, Steam Deactivated: | | |
| Relative Activity | 26.7 | 44.8 |
| D+L | 28.4 | 38.0 |
| Gas Factor | 1.11 | 0.97 |
| Coke Factor | 1.01 | 0.71 |
| Gas Gravity | 1.37 | 1.32 |
| Pilot Plant Deactivated: | | |
| Relative Activity | 40.7 | 53.5 |
| D+L | 36.1 | 41.5 |
| Gas Factor | 0.89 | 0.92 |
| Coke Factor | 0.79 | 0.63 |
| Gas Gravity | 1.43 | 1.34 |
| Physical Characteristics Following Pilot Plant Deactivation: | | |
| N$_2$ Area, m.$^2$/g | 174 | 208 |
| Total Pore Volume, cc./g | 0.65 | 0.91 |
| Loose Density, g./cc | 0.552 | 0.462 |
| Packed Density, g./cc | 0.635 | 0.528 |
| Attrition Loss, percent | 8.4 | 5.8 | alumina catalyst prepared similarly to NA. NC is a "semi-synthetic" catalyst made by in-situ precipitation of alumina gel on an acid-treated clay catalyst. Table VII also includes test cracking data on these catalysts after poisoning the catalysts with nickel by the nickel chelate method described above.

TABLE VII

| Catalyst | NA | | NB | | NC | | VI | |
|---|---|---|---|---|---|---|---|---|
| Test Cracking Virgin: | | | | | | | | |
| Relative Activity | 134.0 | | 149.0 | | 41.0 | | 141.5 | |
| D+L | 62.8 | | 65.4 | | 36.2 | | 64.0 | |
| Gas Factor | 0.77 | | 0.83 | | 1.27 | | 0.91 | |
| Coke Factor | 0.88 | | 0.98 | | 1.13 | | 0.85 | |
| Gas Gravity | 1.54 | | 1.46 | | 1.16 | | 1.43 | |
| Steamed 24 hours at 1,150° F.: | | | | | | | | |
| Nickel Content (p.p.m.) | | 580 | | 703 | 182 | 656 | | 716 |
| Relative Activity | 52.8 | 37.5 | 59.4 | 57.0 | 28.6 | 26.3 | 80.3 | 81.6 |
| D+L | 41.2 | 34.5 | 43.6 | 42.8 | 29.5 | 28.8 | 50.7 | 50.9 |
| Gas Factor | 0.83 | 1.22 | 0.94 | 1.21 | 1.15 | 1.22 | 0.83 | 0.94 |
| Coke Factor | 0.72 | 1.19 | 0.78 | 0.95 | 0.82 | 1.03 | 0.68 | 0.81 |
| Gas Gravity | 1.49 | 1.18 | 1.48 | 1.14 | 1.36 | 1.21 | 1.43 | 1.29 |
| Resteamed 6 Hrs. 1,450° F.: | | | | | | | | |
| Relative Activity | 16.4 | | 22.3 | | 13.4 | | 44.8 | |
| D+L | 20.6 | | 25.2 | | 18.3 | | 38.0 | |
| Gas Factor | 1.19 | | 1.39 | | 1.40 | | 0.97 | |
| Coke Factor | 1.21 | | 1.18 | | 1.15 | | 0.71 | |
| Gas Gravity | 1.28 | | 1.36 | | 1.14 | | 1.32 | |

It is claimed:

1. A solid synthetic gel catalyst composite characterized by increased resistance to the poisoning effect of nickel containing about 30 to 75% total alumina in the composite and consisting essentially of about 50 to 97% of synthetic gel silica-alumina particles containing about 25 to 40% alumina, the balance being essentially silica, mixed with about 3 to 50% of particles of synthetic hydrous alumina selected from the group consisting of amorphous hydrous alumina and boehmite having a crystallite size of up to about 50 A., said catalyst containing less than about 0.5% sulfate.

2. The catalyst of claim 1 in which the total alumina in the composite is about 40 to 55%.

3. The catalyst of claim 1 in which the silica-alumina particles are about 75 to 91% of the catalyst.

4. The catalyst of claim 1 in which the silica-alumina particles have about 25 to 35% alumina.

5. The catalyst of claim 1 in which the catalyst is about 10 to 150 microns in size.

6. The catalyst of claim 1 in which the alumina particles are boehmite of about 25 to 40 A.

7. A hydrocarbon cracking catalyst composite characterized by increased resistance to the poisoning effect of nickel containing about 40 to 55% total alumina in the composite and consisting essentially of about 75 to 91% of synthetic silica-alumina particles containing about 25 to 35% alumina, the balance being essentially silica, mixed with about 9 to 25% alumina selected from the group consisting of amorphous hydrous alumina particles and boehmite of about 25 to 40 A. crystallite size, said catalyst containing less than about 0.5% sulfate.

References Cited by the Examiner

UNITED STATES PATENTS

| | | | |
|---|---|---|---|
| 2,850,462 | 9/1958 | Plank | 252—411 |
| 2,933,456 | 4/1960 | Braithwaite | 252—455 |
| 3,158,565 | 11/1964 | Sanford et al. | 208—120 |

DELBERT E. GANTZ, *Primary Examiner.*

ALPHONSO D. SULLIVAN, *Examiner.*

A. RIMENS, *Assistant Examiner.*